(12) United States Patent
Dodge et al.

(10) Patent No.: US 9,333,584 B2
(45) Date of Patent: May 10, 2016

(54) MODIFIED PHASE SHIFTED GATE DRIVE

(75) Inventors: Robert L. Dodge, Mentor, OH (US); Lifeng Luo, Solon, OH (US); Todd Kooken, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2183 days.

(21) Appl. No.: 12/407,258

(22) Filed: Mar. 19, 2009

(65) Prior Publication Data

US 2010/0237053 A1  Sep. 23, 2010

(51) Int. Cl.
*B23K 9/10* (2006.01)
*B23K 9/09* (2006.01)
*B23K 9/12* (2006.01)
*H02M 3/335* (2006.01)
*H02M 3/158* (2006.01)

(52) U.S. Cl.
CPC .............. *B23K 9/1056* (2013.01); *B23K 9/093* (2013.01); *H02M 3/33569* (2013.01); *B23K 9/091* (2013.01); *B23K 9/092* (2013.01); *B23K 9/1006* (2013.01); *H02M 2003/1586* (2013.01)

(58) Field of Classification Search
CPC .......... B23K 9/091; B23K 9/092; B23K 9/32; B23K 9/1062; B23K 9/0956; B23K 9/1006; B23K 9/1068; B23K 9/1056; B23K 33/004
USPC ....... 219/130.51, 137 PS, 136, 130.5, 130.01, 219/130.1, 130.31, 130.33, 137 R
See application file for complete search history.

(56) References Cited

U.S. PATENT DOCUMENTS

| 4,897,522 | A | * | 1/1990 | Bilczo et al. ............. 219/130.32 |
| 4,947,021 | A | * | 8/1990 | Stava ........................ 219/130.51 |
| 5,343,016 | A | * | 8/1994 | Davis et al. ................ 219/130.4 |
| 5,351,175 | A | * | 9/1994 | Blankenship ................... 363/16 |
| 6,177,651 | B1 | * | 1/2001 | Reynolds et al. ....... 219/137 PS |
| 6,268,587 | B1 | * | 7/2001 | Kooken et al. .......... 219/130.32 |
| 6,995,337 | B2 | * | 2/2006 | Blankenship et al. ..... 219/130.1 |
| 2005/0006364 | A1 | | 1/2005 | Blankenship et al. | |

FOREIGN PATENT DOCUMENTS

| EP | 0963805 A2 | 12/1999 |
| EP | 1 337 033 A2 | 8/2003 |
| EP | 1337033 A2 * | 8/2003 .............. H02M 7/48 |

OTHER PUBLICATIONS

PCT/IB2010/000594 International Search Report and Written Opinion dated Aug. 5, 2010.

* cited by examiner

*Primary Examiner* — Dana Ross
*Assistant Examiner* — Hemant Mathew
(74) *Attorney, Agent, or Firm* — Hahn Loeser & Parks LLP

(57) ABSTRACT

A modified phase shift scheme that provides the minimum on-time and regulation benefits of the conventional phase shift method with the reduced circulating current benefits of the traditional PWM control. A welding machine comprises an inverter operatively connected to a controller, wherein the controller controls a welding process of the welding machine using modified phase shifted switching of the inverter.

20 Claims, 9 Drawing Sheets

MODIFIED PHASE SHIFTED GATE DRIVE

CROSS-REFERENCE TO RELATED APPLICATIONS/INCORPORATION BY REFERENCE

U.S. Pat. No. 6,995,337 to Blankenship et al. issued on Feb. 7, 2006 is incorporated herein by reference in its entirety as background information related to arc welding power sources. U.S. Pat. No. 5,351,175 to Blankenship issued on Sep. 27, 1994 is incorporated herein by reference in its entirety as background information related to inverter power supplies for welding. U.S. Pat. No. 4,897,522 to Bilczo et al. issued on Jan. 30, 1990 is incorporated herein by reference in its entirety as background information related to inverter power supplies for welding.

TECHNICAL FIELD

Certain embodiments relate to electric arc welding. More particularly, certain embodiments relate to systems and methods for providing a modified phase shifted gate drive in a power source for an electric arc welder having an inverter.

BACKGROUND

Traditional inverter-type welding power sources often use a dual double forward, pulse width modulated (PWM), hard switching topology. One of the challenges of such a PWM method is effectively regulating low output power applications without operating the switching devices in a linear mode. Such applications typically require very short cycle on-times that are in direct conflict with the minimum on-times necessary to ensure that the switching devices operate in the full conduction mode (fully saturated), which is critical to limiting power dissipation and maximizing the life of the devices. Traditionally, a minimum cycle on-time has been used to ensure that the switching devices achieve full conduction during each cycle. However, this may result in "skip firing" at low output power levels, which is difficult to regulate and can produce undesirable audible noise.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

A modified phase shift scheme has been devised that provides the minimum on-time and regulation benefits of the conventional phase shift method with the reduced circulating current benefits of the traditional PWM control. A welding machine comprises an inverter operatively connected to a controller, wherein the controller controls a welding process of the welding machine using modified phase shifted switching of the inverter.

These and other features of the claimed invention, as well as details of illustrated embodiments thereof, will be more fully understood from the following description and drawings.

DETAILED DESCRIPTION

Figure 1:
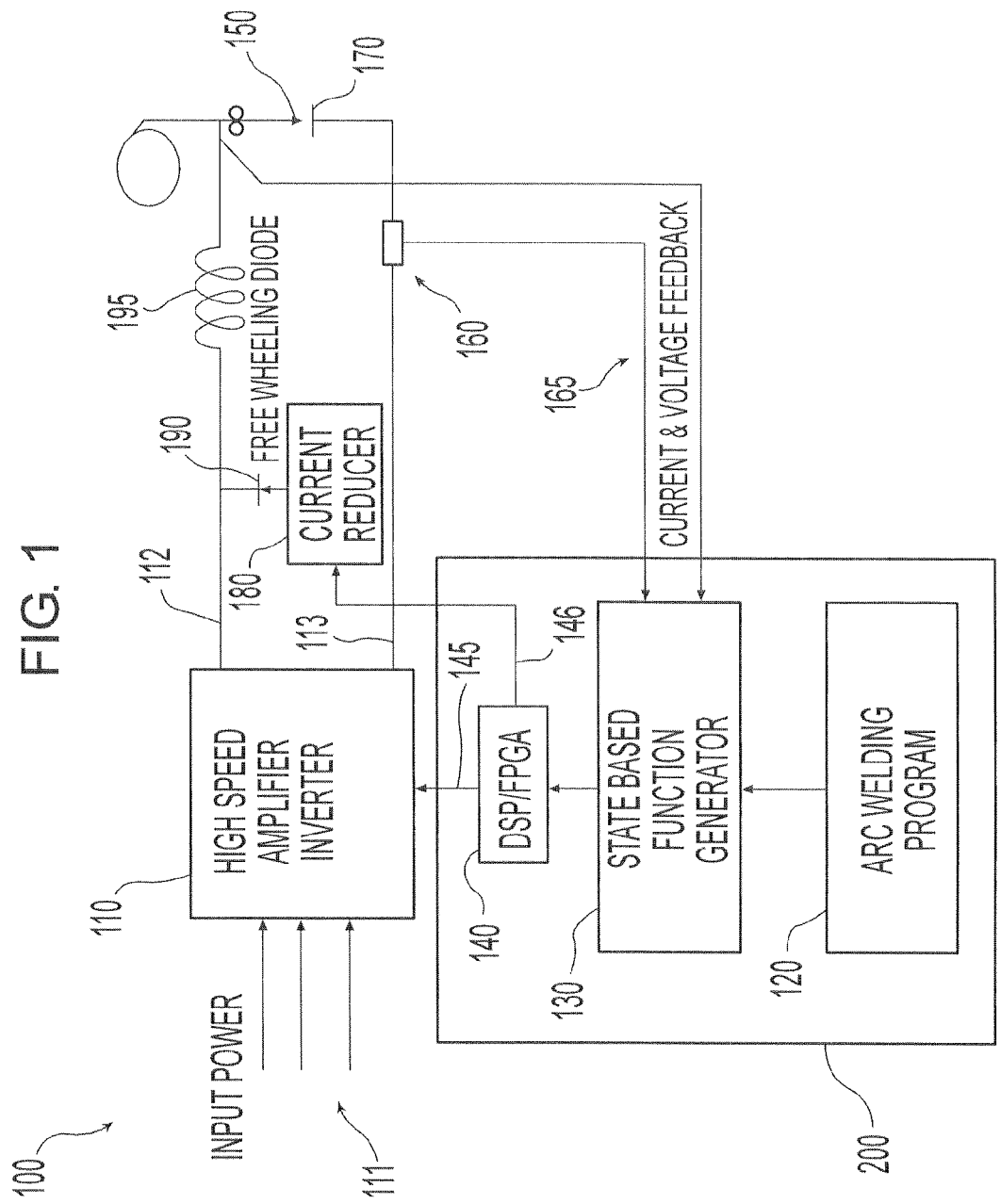
FIG. 1 illustrates an example embodiment of an arc welding power supply having a high speed amplifier inverter.

FIG. 1 illustrates an exemplary embodiment of an arc welding power supply 100 having a high speed (e.g., 120 KHz) amplifier inverter 110. Also illustrated is associated arc welding feedback capability 160 (shown operatively connected to a welding electrode 150 and a welding workpiece 170 which are not a part of the arc welding power supply 100). The arc welding power supply 100 is a state machine type of system which is well known in the art. A general description of the arc welding power supply 100 is provided herein to provide the proper context for embodiments of the present invention.

The arc welding power supply 100 includes an arc welding program 120 loaded onto a state based function generator 130. In accordance with an embodiment of the present invention, the state based function generator 130 includes a programmable microprocessor device. The arc welding program 120 includes the software instructions for generating an arc welding waveform. The system further includes a digital signal processor (DSP) and/or a fully programmable gate array (FPGA) 140 operationally interfacing to the state based function generator 130. The system also includes a high speed amplifier inverter 110 operationally interfacing to the DSP/FPGA 140, although embodiments of the present invention may be accommodated by lower speed inverters. The arc welding program 120, the state based function generator 130, and the DSP/FPGA 140 are elements of a welding controller 200.

The DSP/FPGA 140 takes its instructions from the state based function generator 130 and controls the high speed amplifier inverter 110. The high speed amplifier inverter 110 transforms a high voltage input power 111 into a low voltage welding output power in accordance with control signals 145 from the DSP/FPGA 140. For example, in accordance with an embodiment of the present invention, the DSP/FPGA 140 provides control signals 145 which determine a firing angle (timing of switch or gate activation) for the high speed amplifier inverter 110 to produce various segments of an electric welding waveform.

The outputs 112 and 113 of the high speed amplifier inverter 110 may be operationally connected to a welding electrode 150 and a workpiece 170 respectively through a choke 195 to provide a welding current which forms an electric arc between the electrode 150 and the workpiece 170.

The arc welding power supply 100 also includes voltage and current feedback capability 160 which senses or measures a voltage between the electrode 150 and the workpiece 170 and which senses current flowing through the welding circuit formed by the electrode 150, the workpiece 170, and high speed amplifier inverter 110. The sensed current and voltage may be fed back over the feedback path 165 and used by the state based function generator 130 to, for example, detect shorting of the electrode 150 to the workpiece 170 (i.e., a short condition) and to detect when a molten metal ball is about to pinch off from the electrode 150 (i.e., a de-short condition) during a welding process. Instantaneous output voltage and current may be continuously monitored and fed back.

The arc welding power source 100 may optionally include a current reducer 180 and a diode 190. The current reducer 180 and the diode 190 are operationally connected between the outputs 112 and 113 of the high speed amplifier inverter 110. The current reducer 180 also operationally interfaces to the DSP/FPGA 140. When a short condition occurs between the electrode 150 and the workpiece 170, the DSP/FPGA 140 may command the current reducer 180, via a control signal 146, to pull the current level through the welding circuit below a predefined background current level. Similarly, when a de-short condition occurs (i.e., a molten metal ball pinches off from the distal end of the electrode 150) the DSP/FPGA 140 may command the current reducer 180 to again pull the current level through the welding circuit below a predefined background current level. In accordance with an embodiment of the present invention, the current reducer 180 includes a Darlington switch, a resistor, and a snubber and is well known in the art.

Figure 2:
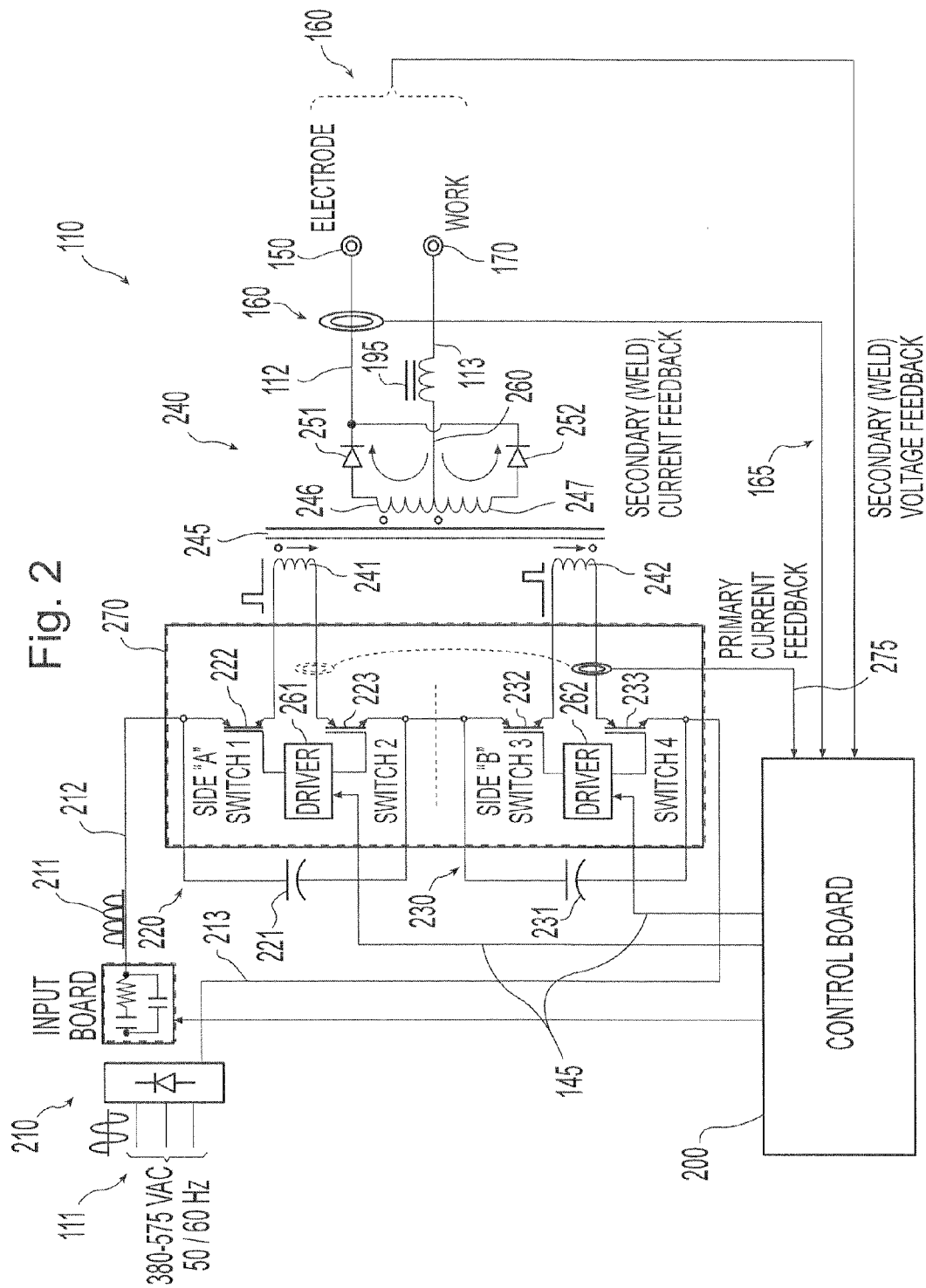
FIG. 2 illustrates an example embodiment of the high speed amplifier inverter of FIG. 1 and an associated output section.

FIG. 2 illustrates an exemplary embodiment of the high speed amplifier inverter 110 of FIG. 1 and an associated output section. However, in FIG. 2, the optional current reducer 180 and diode 190 are not shown. The inverter 110 includes an input rectifier 210 having a three phase input 111 and defining a DC bus at leads 212 and 213. The input rectifier converts the three phase AC power on the input 111 to a rectified DC output power 211. Between the leads of the DC bus, there is provided two primary circuits 220 and 230 connected in series and operated alternately to create output pulses for the primary side of the output transformer 240. Series connected capacitors 221 and 231 are at the input side of the primary circuits 220 and 230.

As used herein, the terms "switch" and "gate" are used interchangeably. The first circuit 220 includes coordinated switches or gates 222 (first switch 1) and 223 (second switch 2) to create pulses by applying the voltage of capacitor 221 across the primary winding 241 of the output transformer 240. The second circuit 230 includes coordinated switches 232 (third switch 3) and 233 (fourth switch 4) to create pulses by applying the voltage of capacitor 231 across the primary winding 242 of the output transformer 240. In accordance with certain embodiments of the present invention, the switches 222, 223, 232, and 233 may each be isolated gate bipolar transistors (IGBTs) or field effect transistors (FETs), which are well known in the art.

The primary windings 241 and 242 transfer pulses of energy through the core 245 of the output transformer 240 to the secondary windings 246 and 247, respectively, of the output transformer 240 having output leads directed to an output rectifier formed by diodes 251 and 252. A center tap lead 260, together with the diodes 251 and 252, provides a welding current across the electrode 150 and the workpiece 170 via the outputs 112 and 113 through a choke 195. Notice that in FIG. 2 the choke 195 is shown connected in series with the output 113 and in FIG. 1 the choke 195 is shown connected in series with the output 112. Either choke configuration is viable.

As an alternative, the two primary circuits 220 and 230 may be connected such that capacitors 221 and 231 and their associated switch groups are connected in parallel instead of in series. A parallel configuration may be more effective when operating with lower input voltages, whereas a series configuration may be more effective when operating with higher input voltages.

In general, switches 222 and 223 turn on together to energize the primary winding 241 with the voltage across capacitor 221 to create a primary output pulse. Switches 232 and 233 are off when switches 222 and 223 are turned on. Similarly, during a subsequent switching cycle, switches 232 and 233 are turned on and switches 222 and 223 are turned off, energizing the primary winding 242 with the voltage across the capacitor 231 to create a next primary output pulse. This process is alternated to produce primary output pulses by circuits 220 and 230 forming the primary section of the output transformer 240 for the inverter 110 of the power source 100. The circuits 220 and 230 are operated in an alternating manner back and forth such that the flux in the core 245 goes one way and then the other in order to keep the output transformer 240 balanced. If, for example, the circuit 220 were fired twice in a row, the core 225 would become saturated and the output on the secondary side of the transformer 240 would be lost.

In accordance with an embodiment of the present invention, the switches 222 and 223 are driven by the driver element 261 and the switches 232 and 233 are driven by the driver element 262. The inputs to the driver elements 261 and 262 are the control signals 145 from the controller 200.

Figure 3:
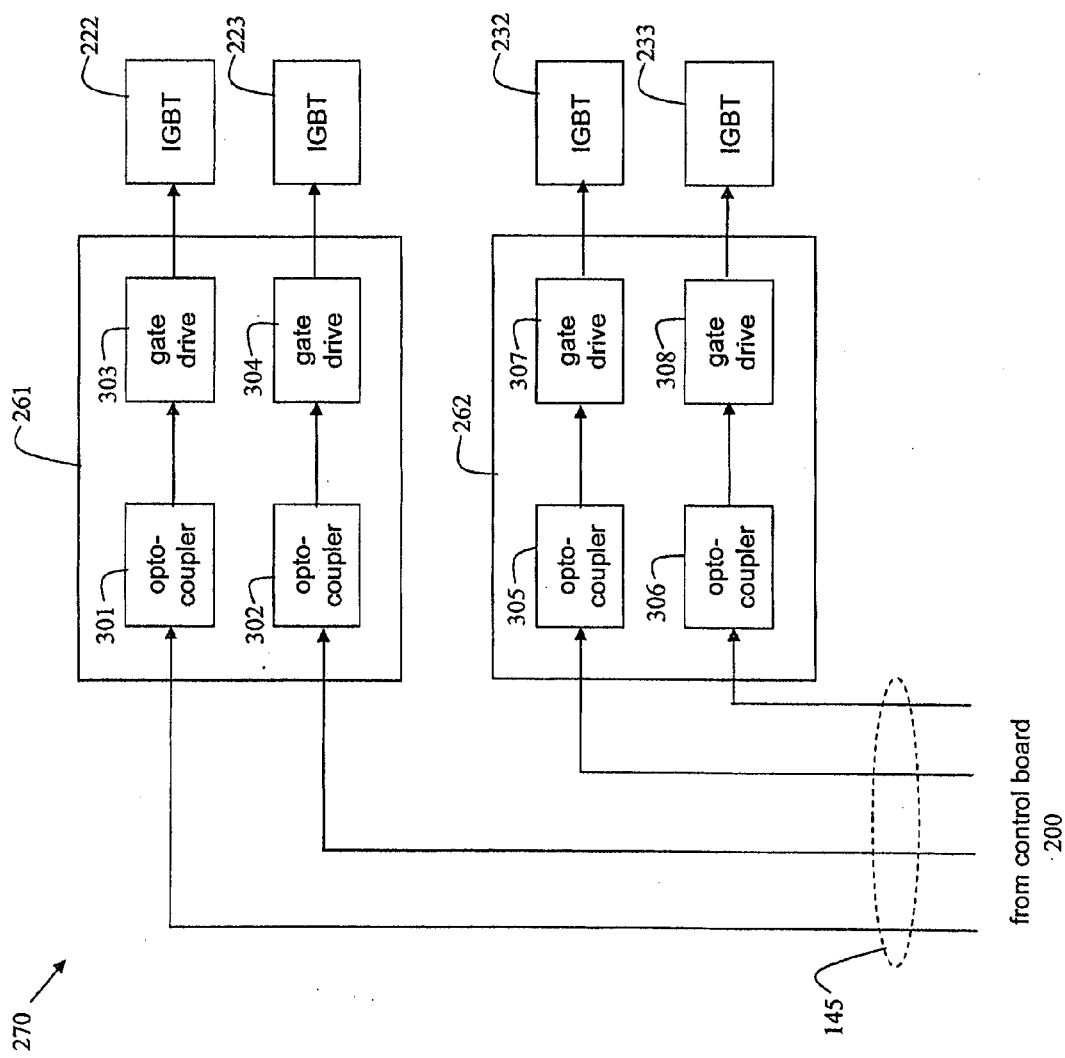
FIG. 3 illustrates a functional block diagram of a portion of the switch board of the high speed amplifier inverter of FIG. 2, in accordance with an embodiment of the present invention.

FIG. 3 illustrates a functional block diagram of a portion of the switch board 270 of the high speed amplifier inverter 110 of FIG. 2, in accordance with an embodiment of the present invention. The drive 261 includes a pair of opto-couplers 301 and 302 and a pair of gate drives 303 and 304. The drive 262 includes a pair of opto-couplers 305 and 306 and a pair of gate drives 307 and 308. The opto-coupler 301 is driven by the control signals 145 from the control board 200. The gate drive 303 is driven by an output of the opto-coupler 301. The IGBT 222 (switch 1) is driven by an output of the gate drive 303. Similarly, the opto-coupler 302 is driven by the control signals 145 from the control board 200, the gate drive 304 is driven by an output of the opto-coupler 302, and the IGBT 223 (switch 2) is driven by an output of the gate drive 304. The opto-coupler 305 is driven by the control signals 145 from the control board 200, the gate drive 307 is driven by an output of the opto-coupler 305, and the IGBT 232 (switch 3) is driven by an output of the gate drive 307. The opto-coupler 306 is driven by the control signals 145 from the control board 200, the gate drive 308 is driven by an output of the opto-coupler 306, and the IGBT 233 (switch 3) is driven by an output of the gate drive 308. In accordance with an embodiment of the present invention, each opto-coupler/gate drive/IGBT series combination may be independently driven by the control signals, providing maximum driving flexibility.

The opto-couplers 301, 302, 305, and 306 serve to electrically isolate the relatively low level control signals 145 from the gate drives 303, 304, 307, and 308, respectively. Such opto-couplers are well known in the art. The gate drives 303, 304, 307, and 308 serve to provide a high current "turn on" signal to each of the switches 222, 223, 232, and 233, respectively. Each of the gate drives 303, 304, 307, and 308 may include a totem-pole driver chip that is powered by 15 VDC power supplies, in accordance with an embodiment of the present invention. The turn-on times and turn-off times of the switches 222, 223, 232, and 233 are defined by the control signals 145 from the controller 200. The controller 200 serves as a quasi-pulse width modulator that generates the driving control signals 145 based on, at least in part, voltage and current feedback signals 165 from the welder output for a given operating set point. In accordance with other embodiments of the present invention, the driving control signals 145 may be generated in response to, at least in part, current feedback signals 275 from the primary side of the output transformer 240 (see FIG. 2).

The control signals 145 from the controller 200 are capable of independently controlling each of the four opto-couplers 301, 302, 305, and 306 and, as a result, each of the four switches 222, 223, 232, and 233 via the gate drives 303, 304, 307, and 308. Therefore, the four switches 222, 223, 232, and 233 may be turned on and off in a variety of coordinated ways to create output pulses through the output transformer 240. The output transformer 240 allows generated pulses in primary windings 241 and 242 to create current pulses in secondary windings 246 and 247, respectively. In accordance with an alternative embodiment of the present invention, the opto-couplers may reside in the controller 200. In accordance with a further alternative embodiment of the present invention, the opto-couplers may be omitted.

Figure 4:
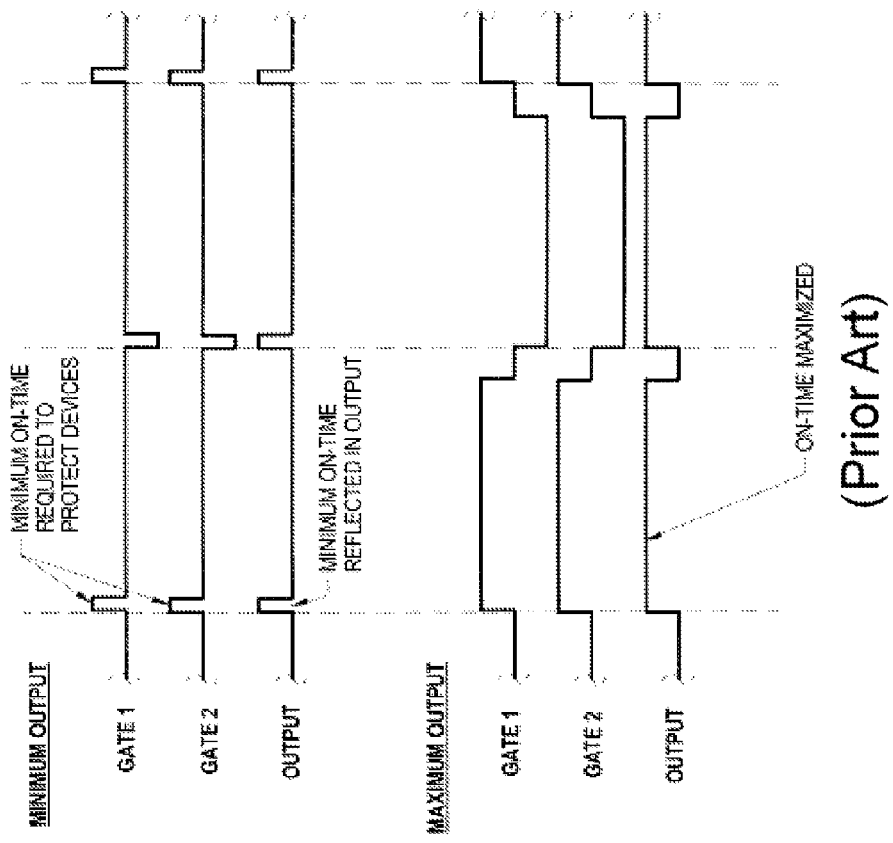
FIG. 4 illustrates an example timing diagram of a traditional PWM switching scheme.

FIG. 4 illustrates an exemplary timing diagram of a traditional PWM switching scheme. Such a traditional PWM switching scheme may be accommodated by the welding power source 100 of FIGS. 1-3. The upper portion of FIG. 4 shows a minimum output scenario and the lower portion of FIG. 4 shows a maximum output scenario. Switch 1 and switch 2 are activated together, and then switch 3 and switch 4 are activated together, in an alternating manner. An output pulse results only during an overlap time of switch 1 and switch 2 or switch 3 and switch 4. In FIG. 4, since the pulses generated by switch 1 and switch 2 (and by switch 3 and switch 4) are totally synchronous, the pulses always overlap and an output is always produced for each cycle.

Ideally, there are times when it is desirable to regulate to a low output power or no output power. This could theoretically be accomplished by turning on the switches for a very short period of time. However, each of the switches has a minimum recommended on-time as shown in the upper portion of FIG. 4. This minimum on-time allows enough time for a switch to be fully turned on before turning the switch back off. Furthermore, this minimum on-time is reflected in the resultant output as shown in FIG. 4.

The switch is recommended to be fully turned on (i.e., fully saturated in full conduction mode) during any given cycle in order to prevent the switch from becoming damaged. Also, it is difficult to regulate a low output power if the switches are not fully turned on (e.g., trying to operate the switches in a linear region). Also, if the switches are not fully turned on during operation, the capacitors 221 and 231 may go out of balance and the switches may start dissipating more power, which is undesirable. Therefore, with traditional PWM, a technique that uses a minimum cycle on-time has been employed to ensure that the switches achieve full conduction during each cycle. However, such a technique may result in "skip firing" at low output power levels, which is difficult to regulate and may produce undesirable audible noise.

Figure 5:
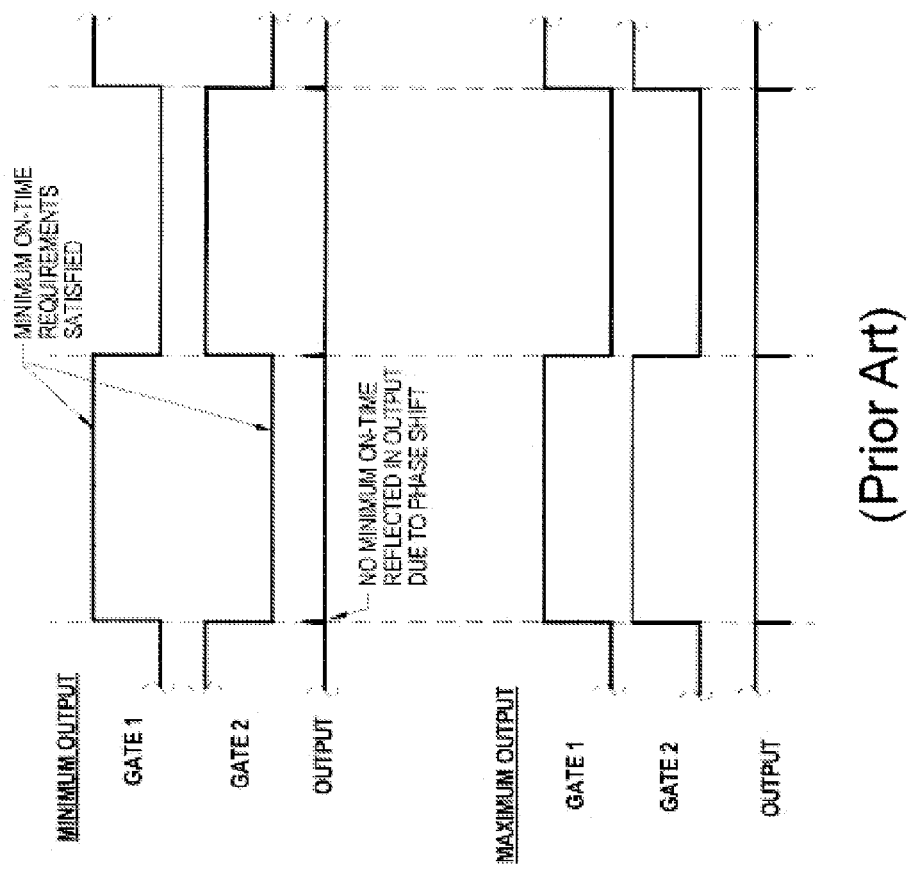
FIG. 5 illustrates an example timing diagram of a traditional phase shifted switching scheme.

FIG. 5 illustrates an exemplary timing diagram of a traditional phase shifted switching scheme. The upper portion of FIG. 5 shows a minimum output scenario and the lower portion of FIG. 5 shows a maximum output scenario. The traditional phase shifted switching scheme is typically associated with full bridge topologies (not the topology of FIG. 2) to provide zero voltage switching (ZVS). Rather than pulse width modulating the gate signals, this switching scheme uses a phase shift relationship between fixed width gate pulses to control the output. The amount of overlap between the gate pulses determines the actual output level. In addition to accommodating ZVS in the full bridge topology, a secondary benefit is that the switches (gates) are always driven to saturation (fully on) even while yielding no output (zero output). Again, the topology of FIG. 2 does not accommodate such a traditional phase shifted switching scheme.

Figure 6:
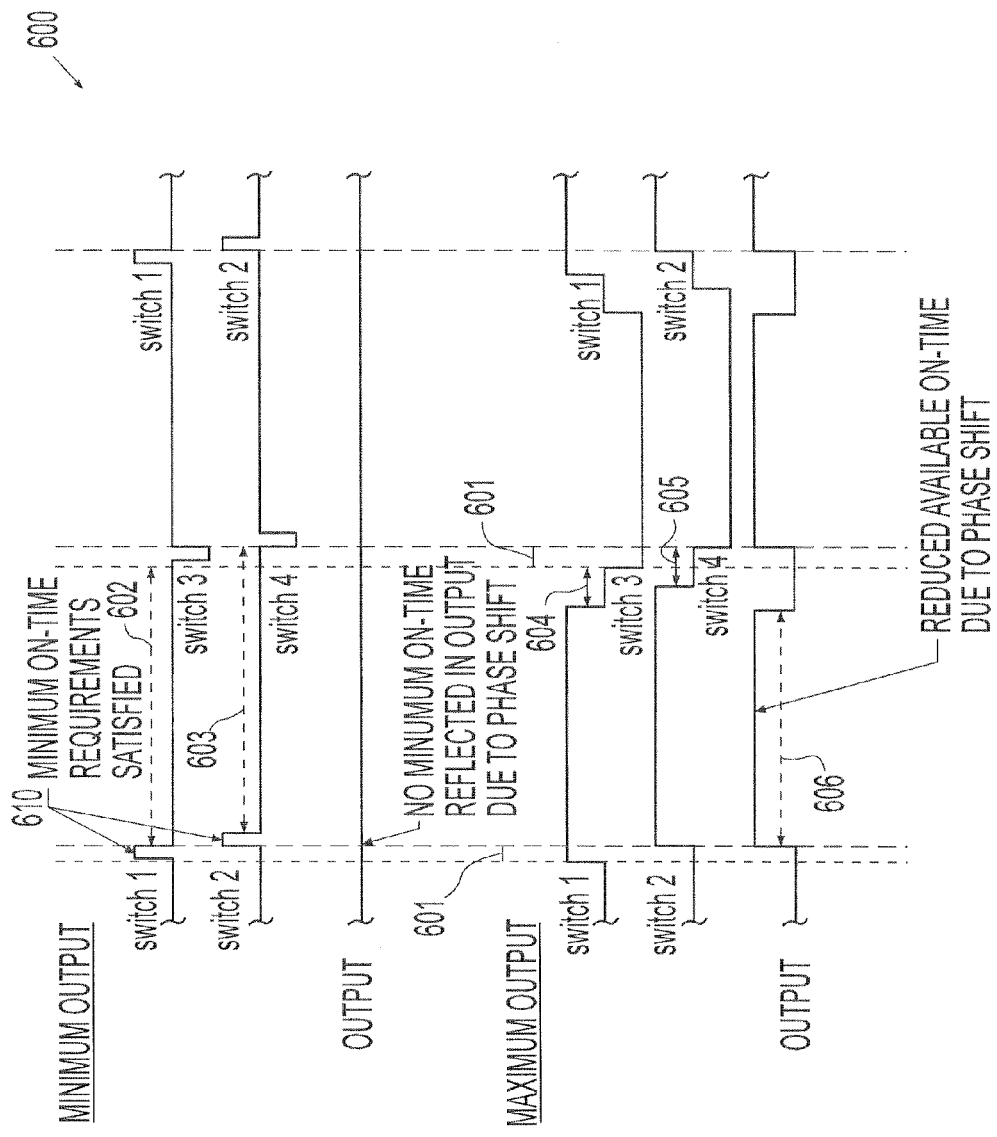
FIG. 6 illustrates an example timing diagram of a modified phase shifted switching scheme, in accordance with a first embodiment of the present invention, which may be accommodated by the welding power source of FIGS. 1-3.

FIG. 6 illustrates an exemplary timing diagram of a modified phase shifted switching scheme 600, in accordance with a first embodiment of the present invention, which may be accommodated by the welding power source 100 of FIGS. 1-3. The upper portion of FIG. 6 shows a minimum output scenario and the lower portion of FIG. 6 shows a maximum output scenario. Switch 1 and switch 2 are activated first, with a fixed phase shift 601 established between switch 1 and switch 2. Similarly, after maximum dead times, switch 3 and switch 4 are activated next, with the same fixed phase shift 601 established between switch 3 and switch 4. This process repeats in an alternating manner. In accordance with an embodiment of the present invention, the fixed phase shift may be between 500-1000 microseconds.

The dead times ensure that current stops flowing in one primary side before the switches of the other primary side are turned on, to prevent undesired effects. In accordance with an embodiment of the present invention, during the dead times, an equal amount of free-wheeling current flows through both secondary windings and keeps the core 245 of the output transformer 240 balanced. In accordance with an embodiment of the present invention, during the dead time, processing with respect to measured feedback current/voltage measurements may be performed, for example.

An output is produced only during a time when the positive-going pulses produced by switch 1 and switch 2 (and the negative-going pulsed produced by switch 3 and switch 4) overlap (e.g., a minimum overlap, an intermediate overlap, or a maximum overlap). The fixed phase shift corresponds to the minimum recommended on-time of the switches. Referring to the upper portion of FIG. 6, switch 1 is turned on for the minimum recommended on-time 610 and then is turned off. Next, switch 2 is turned on for the minimum recommended on-time 610 and then is turned off. Since there is no overlap between the pulses produced by switch 1 and switch 2, a zero output is achieved while also meeting the minimum recommended on-time requirement for each switch. Switch 3 and switch 4 follow in a similar manner after the maximum dead times 602 and 603.

In order to begin producing a small non-zero output level, the pulses produced by switch 1 and switch 2 (and switch 3 and switch 4) may be extended beyond the minimum recommended on-time 610 (thus reducing the dead times) such that the pulse produced by switch 1 begins to overlap the pulse produced by switch 2 (and the pulse produced by switch 3 begins to overlap the pulse produced by switch 4). In this manner, very small output on times may be achieved, eliminating any need to "skip fire" at low output levels, while still achieving full conduction of the switches. To produce higher output levels, the pulses produced by switch 1 and switch 2 (and switch 3 and switch 4) may be further extended until the maximum output scenario, as shown in the lower portion of FIG. 6 is achieved, having minimum dead times 604 and 605.

However, by shifting the pulses by a fixed amount, the delay 601 gained at the beginning (leading edge) of the cycle is lost at the end (trailing edge) of the cycle (see the lower portion of FIG. 6), thereby reducing total usable cycle time. This loss in total usable cycle time due to the fixed phase shift 601 limits the maximum output 606 of the welding power source 100. The embodiment of FIG. 7 addresses this issue, allowing a large dynamic range of output voltages and currents to be accommodated.

Figure 7:
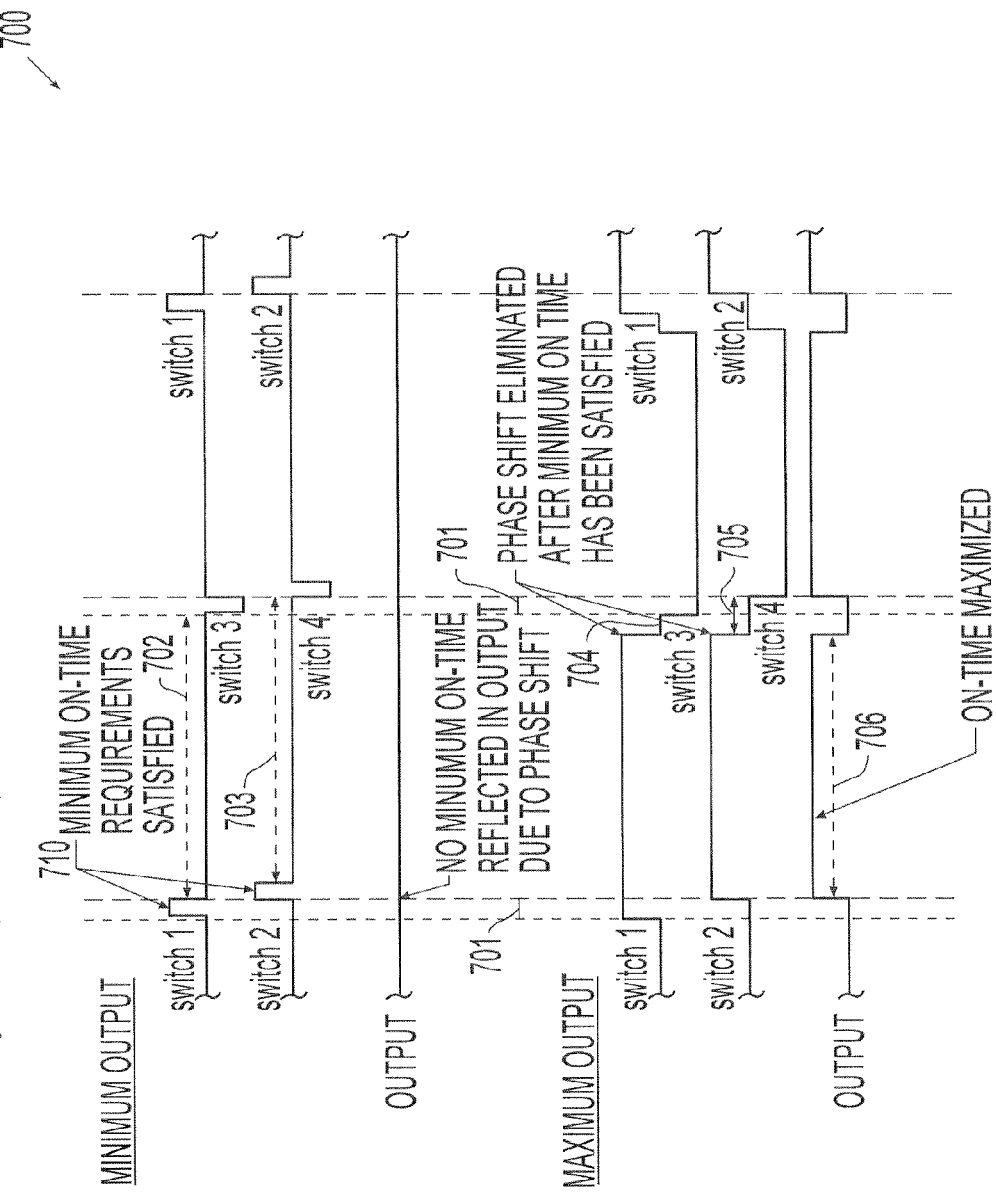
FIG. 7 illustrates an example timing diagram of a modified phase shifted switching scheme, in accordance with a second embodiment of the present invention, which may be accommodated by the welding power source of FIGS. 1-3.

FIG. 7 illustrates an exemplary timing diagram of a modified phase shifted switching scheme 700, in accordance with a second embodiment of the present invention, which may be accommodated by the welding power source 100 of FIGS. 1-3. The upper portion of FIG. 7 again shows a minimum output scenario and the lower portion of FIG. 7 again shows a maximum output scenario. Switch 1 and switch 2 are activated first, with a fixed phase shift 701 established between the leading edges of the pulses produced by switch 1 and switch 2. Similarly, switch 3 and switch 4 are activated next, after maximum dead times, with the same leading edge fixed phase shift 701 established between the pulses produced by switch 3 and switch 4. This process repeats in an alternating manner.

An output is produced only during a time when the pulses produced by switch 1 and switch 2 (and switch 3 and switch 4) overlap (e.g., a minimum overlap, an intermediate overlap, or a maximum overlap). The fixed phase shift 701 corresponds to the minimum recommended on-time of the switches. Referring to the upper portion of FIG. 7, switch 1 is turned on for the minimum recommended on-time 710 and then is turned off. Next, switch 2 is turned on for the minimum recommended on-time 710 and then is turned off. Since there is no overlap between the pulses produced by switch 1 and switch 2, a zero output is achieved while also meeting the minimum recommended on-time requirement for each switch. Switch 3 and switch 4 follow in a similar manner after the maximum dead times 702 and 703.

In order to begin producing a small non-zero output level, the pulses produced by switch 1 and switch 2 (and switch 3 and switch 4) may be extended beyond the minimum recommended on-time 710 (thus reducing the dead times) such that the pulse produced by switch 1 begins to overlap the pulse produced by switch 2 (and the pulse produced by switch 3 begins to overlap the pulse produced by switch 4). In this manner, very small output on times may be achieved, eliminating any need to "skip fire" at low output levels, while still achieving full conduction of the switches. To produce higher output levels, the pulses produced by switch 1 and switch 2 (and switch 3 and switch 4) may be further extended until the maximum output scenario, as shown in the lower portion of FIG. 7 is achieved, having minimum dead times 704 and 705.

Unlike the timing diagram of FIG. 6, the timing diagram of FIG. 7 shows the trailing edges of the pulses produced by switch 1 and switch 2 (and switch 3 and switch 4) occurring at the same time (i.e., the switches turn off at the same time). In FIG. 7, the fixed phase shift 701 occurs at the beginning of the cycle, as in FIG. 6. However, once the prescribed minimum on-time 710 of each switch has been exceeded, the switches (switches 1 and 2 or switches 3 and 4) may turn off simultaneously. As a result, the maximum possible cycle time 706 is not reduced, as it is in FIG. 6. Furthermore, the leading switch is activated during the dead time of the previous cycle, thus maximizing the total on-time and available output power. The timing achieved in the timing diagram of FIG. 7 may be accomplished by the inverter 110 of FIGS. 1-3 under the control of the controller 200 of FIG. 1 and FIG. 2, as described herein.

Figure 8:
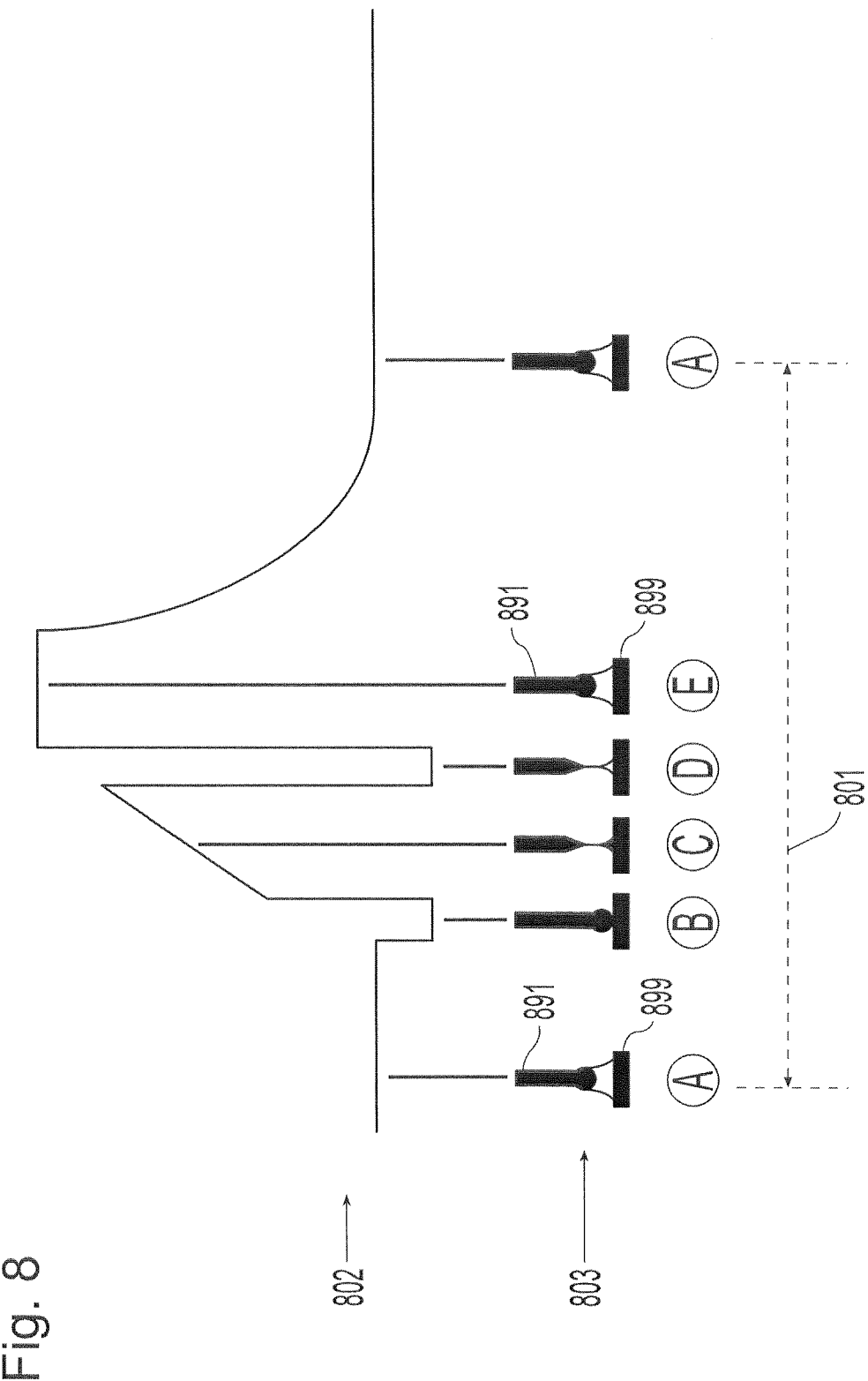
FIG. 8 illustrates an example embodiment of a welding process using a welding waveform that may be formed using the arc welding power source of FIG. 1 having the high speed amplifier inverter of FIG. 2 and using the modified phase shifted switching scheme of FIG. 6 or FIG. 7.

FIG. 8 illustrates an exemplary embodiment of a welding process 803 using a welding waveform 802 that may be formed using the arc welding power source 100 of FIG. 1 having the high speed amplifier inverter 110 of FIG. 2 and using the modified phase shifted switching scheme 600 of FIG. 6 or 700 of FIG. 7. The various stages (A-E) of the welding process 803 over the cycle 801 use the arc welding waveform 802 and show the relationships between a welding electrode 891 and a metal workpiece 899. During the welding process 803, a series of electric arc pulses are generated between the advancing electrode 891 and the metal workpiece 899 using the arc welding power supply 100 of FIG. 1 which is capable of generating the arc welding waveform 802 using the inverter 110 to produce the electric arc pulses. The controller 200 generates the control signals 145 to control the switches 222, 223, 232, and 233 through the drivers 261 and 262, as described herein, to produce the various segments of the output current waveform 802 of FIG. 8.

Figure 9:
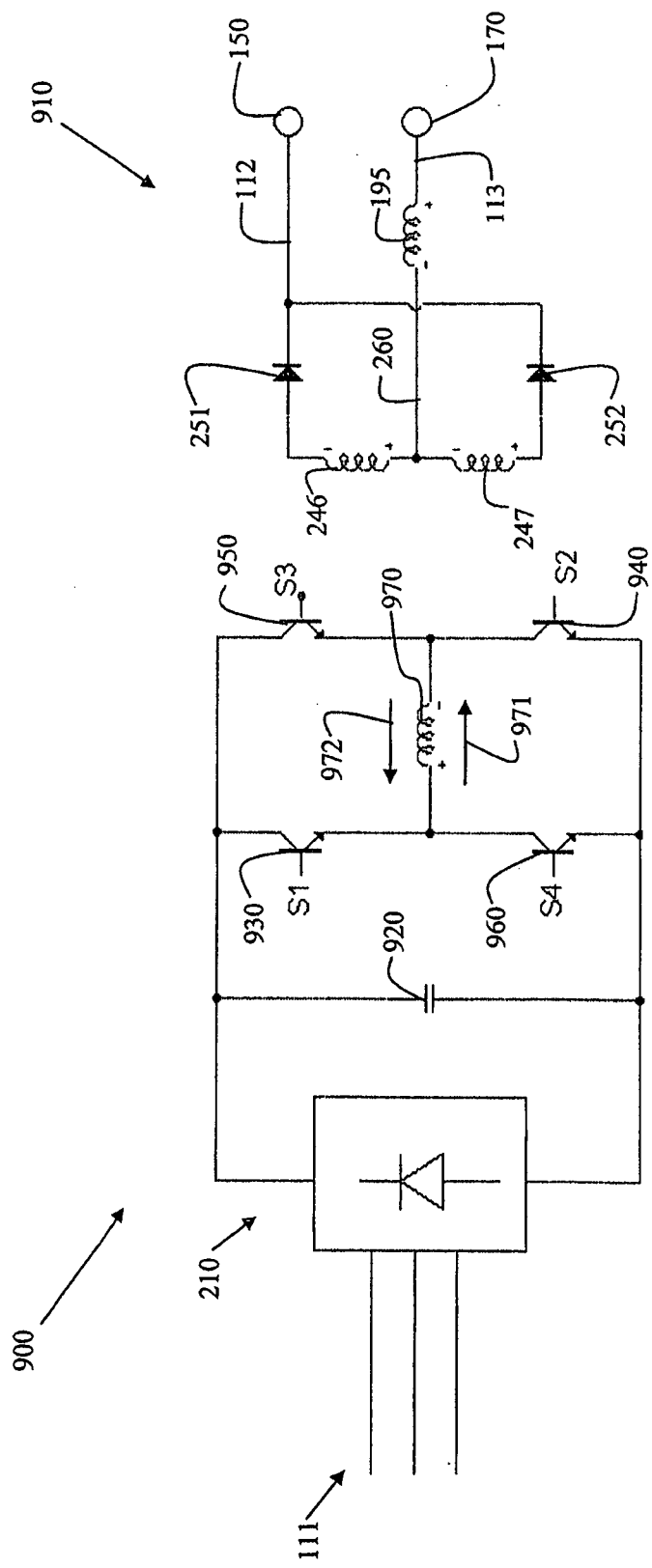
FIG. 9 illustrates a portion of an alternative example embodiment of the high speed amplifier inverter of FIG. 1 having a single primary circuit, and an associated output section (similar to the output section of FIG. 2).

In accordance with an alternative embodiment of the present invention, a single primary circuit may be configured to provide capabilities similar to that of FIG. 2, instead of using two primary circuits. FIG. 9 illustrates a portion 900 of an alternative example embodiment of the high speed amplifier inverter of FIG. 1 having a single primary circuit, and an associated output section 910 (similar to the output section of FIG. 2). Instead of having two primary circuits connected in series between the leads of the DC bus as in FIG. 2, a single primary circuit having a single primary winding is configured as in FIG. 9 and is connected between the leads of the DC bus.

A capacitor 920, a first switch S1 930, a second switch S2 940, a third switch S3 950, a fourth switch S4 960, and a single primary winding 970 are configured as shown in FIG. 9 to form a single primary circuit. The switches S1-S4 are associated with drivers (not shown in FIG. 9 but shown in FIG. 2) to alternately drive the switching pairs (S1 and S2) and (S3 and S4) under the control of a control board 200 (shown in FIG. 2). Switches S1 and S2 control the voltage across the single primary winding 970 in a first direction, and switches S3 and S4 control the voltage across the single primary winding 970 in the other direction. When switches S1 and S2 are driven on, switches S3 and S4 are off and current flows through the single primary winding 970 in the direction 971. Similarly, when switches S3 and S4 are driven on, switches S1 and S2 are off and current flows through the single primary winding 970 in the opposite direction 972. The single primary winding 970 couples voltage pulses to the two secondary windings 246 and 247 through transformer action.

In summary, disclosed is a power source for an electric arc welder including an inverter having a primary circuit and a secondary circuit, where the primary circuit has four switches and is capable of alternately creating primary voltage pulses to induce secondary voltage pulses in the secondary circuit, and where the secondary circuit includes an output circuit capable of being connected to an output welding circuit. Within the power source there is provided a phase shift scheme that provides the minimum on-time and regulation benefits of the conventional phase shift method with the reduced circulating current benefits of the traditional PWM control.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A power source for an electric arc welder comprising:
inverter means having a primary circuit and a secondary circuit, where said primary circuit has four switches and is capable of alternately creating primary voltage pulses to induce secondary voltage pulses in said secondary circuit, and where said secondary circuit includes an output circuit capable of being connected to an output welding circuit;
means for turning on a first switch and a second switch of said primary circuit to establish a fixed phase shift between a first resultant output pulse of said first switch and a second resultant output pulse of said second switch;
means for turning off said first switch and said second switch subsequent to a minimum on-time of each of said first and second switches being achieved;
means for turning on a third switch and a fourth switch of said primary circuit to establish said fixed phase shift between a third resultant output pulse of said third switch and a fourth resultant output pulse of said fourth switch; and
means for turning off said third switch and fourth switch subsequent to a minimum on-time of each of said third and fourth switches being achieved.

2. The power source of claim 1 further comprising means for establishing a dead time between said first output pulse and said third output pulse.

3. The power source of claim 1 further comprising means for establishing a dead time between said second output pulse and said fourth output pulse.

4. The power source of claim 1 wherein said established fixed phase shift is capable of producing no overlap between said first output pulse and said second output pulse to produce a zero output voltage level in said output circuit.

5. The power source of claim 1 wherein said subsequent turning off of said first switch and said second switch is capable of producing a minimum overlap between said first output pulse and said second output pulse to produce a minimum, non-zero output voltage level in said output circuit.

6. The power source of claim 1 wherein said established fixed phase shift is capable of producing no overlap between said third output pulse and said fourth output pulse to produce a zero output voltage level in said output circuit.

7. The power source of claim 1 wherein said subsequent turning off of said third witch and said fourth switch is capable of producing a minimum overlap between said third output pulse and said fourth output pulse to produce a minimum, non-zero output voltage level in said output circuit.

8. The power source of claim 1 wherein said subsequent turning off of said first switch and said second switch occurs simultaneously and is capable of producing a maximum overlap between said first output pulse and said second output pulse to produce a maximum output voltage level in said output circuit.

9. The power source of claim 1 wherein said subsequent turning off of said third switch and said fourth switch occurs simultaneously and is capable of producing a maximum overlap between said third output pulse and said fourth output pulse to produce a maximum output voltage level in said output circuit.

10. The power source of claim 1 wherein said subsequent turning off of said first switch and said second switch occurs simultaneously and is capable of producing an intermediate overlap between said first output pulse and said second output pulse to produce an intermediate output voltage level in said output circuit.

11. The power source of claim 1 wherein said subsequent turning off of said third switch and said fourth switch occurs simultaneously and is capable of producing an intermediate overlap between said third output pulse and said fourth output pulse to produce an intermediate output voltage level in said output circuit.

12. A power source for an electric arc welder comprising:
an inverter having a primary circuit and a secondary circuit, where said primary circuit has four switches and is capable of alternately creating primary voltage pulses to induce secondary voltage pulses in said secondary circuit, and where said secondary circuit includes an output circuit capable of being connected to an output welding circuit;
a first switch and a second switch of said primary circuit;
a third switch and a fourth switch of said primary circuit; and
a controller for independently controlling the timing associated with turning on and turning off each of said first switch, said second switch, said third switch, and said fourth switch.

13. The power source of claim 12 wherein each of said switches includes an isolated gate bipolar transistor (IGBT).

14. The power source of claim 12 wherein each of said switches includes a field effect transistor (FET).

15. The power source of claim 12 further comprising a gate drive circuit operatively connected to each of said switches to drive said switches.

16. The power source of claim 15 further comprising an opto-coupler device operatively connected between each of said gate drive circuits and said controller to electrically isolate said controller from said gate drive circuits.

17. A method, employing a power source for an electric arc welder including an inverter having a primary circuit and a secondary circuit, where said primary circuit has four switches and is capable of alternately creating primary voltage pulses to induce secondary voltage pulses in said secondary circuit, and where said secondary circuit includes an output circuit capable of being connected to an output welding circuit, said method comprising:
turning on a first switch and a second switch of said primary circuit to establish a fixed phase shift between a leading edge of a first resultant output pulse of said first switch and a leading edge of a second resultant output pulse of said second switch;
turning off said first switch and said second switch subsequent to a minimum on-time of each of said first and second switches being achieved to establish a trailing edge of said first resultant output pulse and a trailing edge of said second resultant output pulse;
turning on a third switch and a fourth switch of said primary circuit to establish said fixed phase shift between a leading edge of a third resultant output pulse of said third switch and a leading edge of a fourth resultant output pulse of said fourth switch; and
turning off said third switch and said fourth switch subsequent to a minimum on-time of each of said third and fourth switches being achieved to establish a trailing edge of said third resultant output pulse and a trailing edge of said fourth resultant output pulse.

18. The method of claim 17 wherein said turning off of said first switch and said second switch occurs simultaneously, and wherein said turning off of said third switch and said fourth switch occurs simultaneously.

19. The method of claim 17 further comprising establishing a dead time between said first output pulse and said third output pulse and between said second output pulse and said fourth output pulse.

20. The method of claim 19 further comprising performing processing with respect to a measured feedback current and a measured feedback voltage during said dead time.

* * * * *